United States Patent
Lin et al.

(10) Patent No.: US 10,003,814 B2
(45) Date of Patent: Jun. 19, 2018

(54) IMAGE PROCESSOR, DISPLAY IMAGE PROCESSING METHOD AND ASSOCIATED ELECTRONIC DEVICE

(71) Applicant: MEDIATEK INC., Hsin-Chu (TW)

(72) Inventors: Yu-Mao Lin, Hsinchu (TW); Te-Hao Chang, Taipei (TW); Ying-Jui Chen, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days. days.

(21) Appl. No.: 14/940,164

(22) Filed: Nov. 13, 2015

(65) Prior Publication Data

US 2016/0330350 A1 Nov. 10, 2016

Related U.S. Application Data

(60) Provisional application No. 62/157,530, filed on May 6, 2015.

(51) Int. Cl.
| | |
|---|---|
| *H04N 19/44* | (2014.01) |
| *H04N 9/64* | (2006.01) |
| *H04N 1/41* | (2006.01) |
| *H04N 1/00* | (2006.01) |
| *H04N 1/409* | (2006.01) |

(52) U.S. Cl.
CPC ............. *H04N 19/44* (2014.11); *H04N 1/00* (2013.01); *H04N 1/409* (2013.01); *H04N 1/41* (2013.01); *H04N 9/646* (2013.01)

(58) Field of Classification Search
CPC .......... H04N 13/0066; G06F 17/30265; G06F 17/30268; G06F 17/3028; G08B 13/19671; G08B 13/19673
See application file for complete search history.

(56) References Cited

U.S. PATENT DOCUMENTS

| | | | |
|---|---|---|---|
| 2004/0012694 A1* | 1/2004 | Sato | H04N 1/32112 348/231.99 |
| 2007/0250893 A1* | 10/2007 | Akiyama | H04N 5/208 725/131 |
| 2014/0115536 A1* | 4/2014 | Akiya | G06F 3/0482 715/810 |
| 2014/0333791 A1* | 11/2014 | Takeuchi | H04N 1/3871 348/222.1 |
| 2015/0077603 A1* | 3/2015 | Matsuzawa | H04N 5/77 348/297 |
| 2016/0316203 A1* | 10/2016 | Yadav | H04N 19/117 |

* cited by examiner

*Primary Examiner* — Christopher K Peterson
(74) *Attorney, Agent, or Firm* — Winston Hsu

(57) ABSTRACT

An image processor includes a receiving unit, an information analyzer and an adjusting circuit. The receiving unit is arranged for receiving image/video data and corresponding metadata, the information analyzer is arranged for analyzing the metadata of the image/video data to generate at least one analyzing result for indicating a strength of an image/video quality enhancement, and the adjusting circuit is arranged for adjusting an image/video quality according to the analyzing result.

23 Claims, 10 Drawing Sheets

IMAGE PROCESSOR, DISPLAY IMAGE PROCESSING METHOD AND ASSOCIATED ELECTRONIC DEVICE

CROSS REFERENCE TO RELATED APPLICATIONS

This application claims the priority of U.S. Provisional Application No. 62/157,530, filed on May 6, 2015, which is included herein by reference in its entirety.

BACKGROUND

A display generally comprises an image processor for performing image enhancement operations such as noise reduction, color enhancement and sharpness enhancement. However, the function parameters of these image enhancement operations are generally set for all sorts of images, and this processing method may not provide a best enhancement for every image. For example, excessive enhancement in a noisy image will bring up noise artifact.

SUMMARY

It is therefore an objective of the present invention to provide an image processor and associated display image processing method, which performs adaptive image/video enhancement operations upon image/video data based on metadata of the image/video data, to solve the above-mentioned problems.

According to one embodiment of the present invention, an image processor comprises a receiving unit, an information analyzer and an adjusting circuit. The receiving unit is arranged for receiving image/video data and corresponding metadata, the information analyzer is arranged for analyzing the metadata of the image/video data to generate at least one analyzing result for indicating a strength of an image/video quality enhancement, and the adjusting circuit is arranged for adjusting an image/video quality according to the analyzing result.

According to another embodiment of the present invention, an image processing method comprising: receiving image/video data and corresponding metadata; analyzing the metadata of the image/video data to generate at least one analyzing result for indicating a strength of an image/video quality enhancement; and adjusting an image/video quality according to the analyzing result.

According to another embodiment of the present invention, an electronic device comprises an image sensor, an image signal processor, a memory and an image processor. The image sensor is arranged for capturing light to generate raw image data. The image signal processor is coupled to the image sensor, and is arranged for processing the raw image data to generate image data and corresponding metadata. The memory is coupled to the image signal processor, and is arranged for storing the image data and the corresponding metadata generated from the image signal processor. The image processor is coupled to the memory, and is arranged for obtaining the image data and the corresponding metadata from the memory, analyzing the metadata of the image data to generate at least one analyzing result for indicating a strength of an image quality enhancement, and adjusting an image/video quality according to the analyzing result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
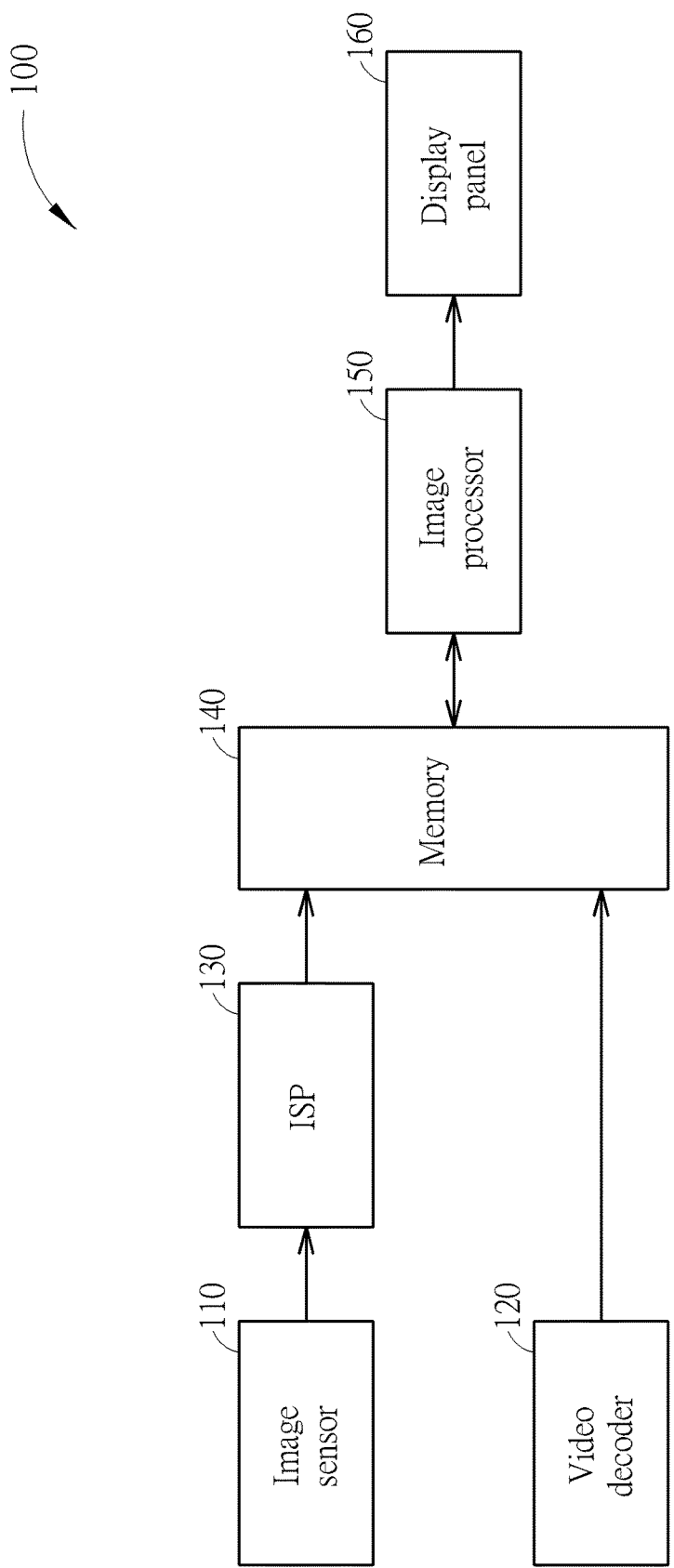
FIG. 1 is a diagram illustrating an electronic device according to one embodiment of the present invention.

Please refer to FIG. 1, which is a diagram illustrating an electronic device 100 according to one embodiment of the present invention. As shown in FIG. 1, the electronic device 100 comprises an image sensor 110, a video decoder 120, and image signal processor (ISP) 130, a memory 140, an image processor 150 and a display panel 160. In this embodiment, the electronic device 100 can be a smartphone, a tablet, a notebook, a camera or any other device having a display panel.

In FIG. 1, the image sensor 110 may be implemented by complementary metal oxide semiconductor (CMOS) sensors or charge coupled device (CCD) sensors, and is arranged to capture light to generate raw image data. The video decoder 120 is arranged to decode a video stream to generate video data to the memory 140, where the video stream may come from another electronic device via wireless or Internet connection(s) or from any other appropriate source, and a video header comprises metadata such as bit-rate and/or image resolution. The ISP (Image Signal Processor) 130 is arranged to receive the raw image data from the image sensor 110 and process the raw image data to generate image data and corresponding metadata, where the metadata may comprise the information about the generation of the raw image data, such as ISO speed (based on the standard from "International Organization for Standardization"), shutter speed and/or aperture value. In addition, the ISO speed is arranged to control the sensitivity of the sensor that absorbs the light. The higher the ISO speed, the more sensitive the sensor is to light.

In one embodiment, the ISP 130 further packets the image data and the corresponding metadata to have Joint Photographic Experts Group (JPEG) format, and the corresponding metadata is an exchangeable image file format (EXIF) information within this JPEG file. The memory 140 is arranged to store the image data and the video data to be displayed. The image processor 150 is arranged to obtain the image/video data and corresponding metadata from the memory 140, analyze the metadata of the image/video data to generate at least one analyzing result for indicating a strength (or degree) of an image quality enhancement needed to be applied, and adjust an image/video quality according to the analyzing result to generate an adjusted image/video data. Then, the adjusted image data is sent to the display panel 160 to be displayed thereon.

Figure 2:
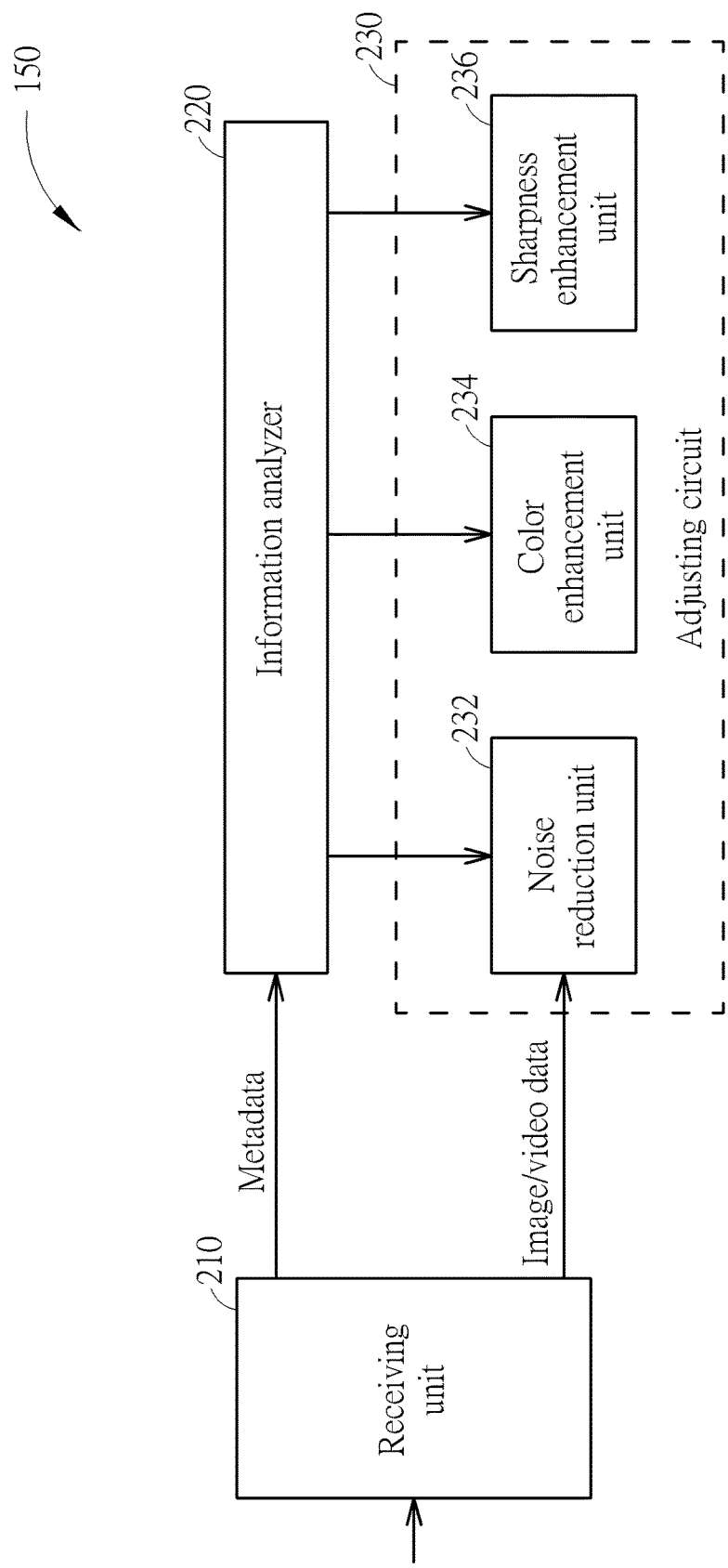
FIG. 2 is a diagram illustrating the image processor according to one embodiment of the present invention.

Refer to FIG. 2, which is a diagram illustrating the image processor 150 according to one embodiment of the present invention. As shown in FIG. 2, the image processor 150 comprises a receiving unit 210, an information analyzer 220 and an adjusting circuit 230, where the adjusting circuit 230 comprises a noise reduction unit 232, a color enhancement unit 234 and a sharpness enhancement unit 236. In FIG. 2, the receiving unit 210 is arranged to receive image/video data and corresponding metadata from the memory 140, and the information analyzer 220 is arranged to analyze the metadata of the image/video data to generate analyzing results, and the adjusting circuit 230 adjusts the image/video data to generate the adjusted image/video data according to analyzing results. The detailed operations of the information analyzer 220 and the adjusting circuit 230 are in the following descriptions.

For the operations of the noise reduction unit 232, the color enhancement unit 234 and the sharpness enhancement unit 236, the noise reduction unit 232 may perform the noise reduction operation upon the image data by using conventional temporal or spatial noise reduction filter or motion-adaptive compensation method, where the strength of the noise reduction operation may be determined by setting the coefficients of the temporal or spatial noise reduction filter. The color enhancement unit 234 may perform the color enhancement operation upon the image data by using conventional hue, saturation and value (HSV) components. The sharpness enhancement unit 236 may perform the sharpness enhancement operation upon the image data by using conventional edge contrast enhancement method. Because a person skilled in this art should understand the operations of the noise reduction, color enhancement and sharpness enhancement operations and how to determine the strengths of these operations, further descriptions are therefore omitted here.

In one embodiment, assuming that the image processor 160 receives the image file with JPEG format from the memory 140, the information analyzer 220 extracts the ISO speed information from the EXIF information, and analyzes a level of the ISO speed to generate the analyzing result, and the noise reduction unit 232, the color enhancement unit 234 and the sharpness enhancement unit 236 determines the enhancement strengths of their operations according to the analyzing result, respectively. In detail, because the lower ISO speed may imply a lower image noise magnitude, therefore, when the ISO speed of the image data is low, the noise reduction unit 232 may apply a weak noise reduction, the color enhancement unit 234 may apply a high strength of the color enhancement (i.e. strong color enhancement), and the sharpness enhancement unit 236 may apply a high strength of the sharpness enhancement (i.e. strong sharpness enhancement) upon the image data. On the other hand, because the higher ISO speed may imply a higher image noise magnitude, therefore, when the ISO speed of the image data is high, the noise reduction unit 232 may apply a strong noise reduction, the color enhancement unit 234 may apply a low strength of the color enhancement (i.e. weak color enhancement), and the sharpness enhancement unit 236 may apply a low strength of the sharpness enhancement (i.e. weak sharpness enhancement) upon the image data to avoid enhancing the noise.

Figure 3:
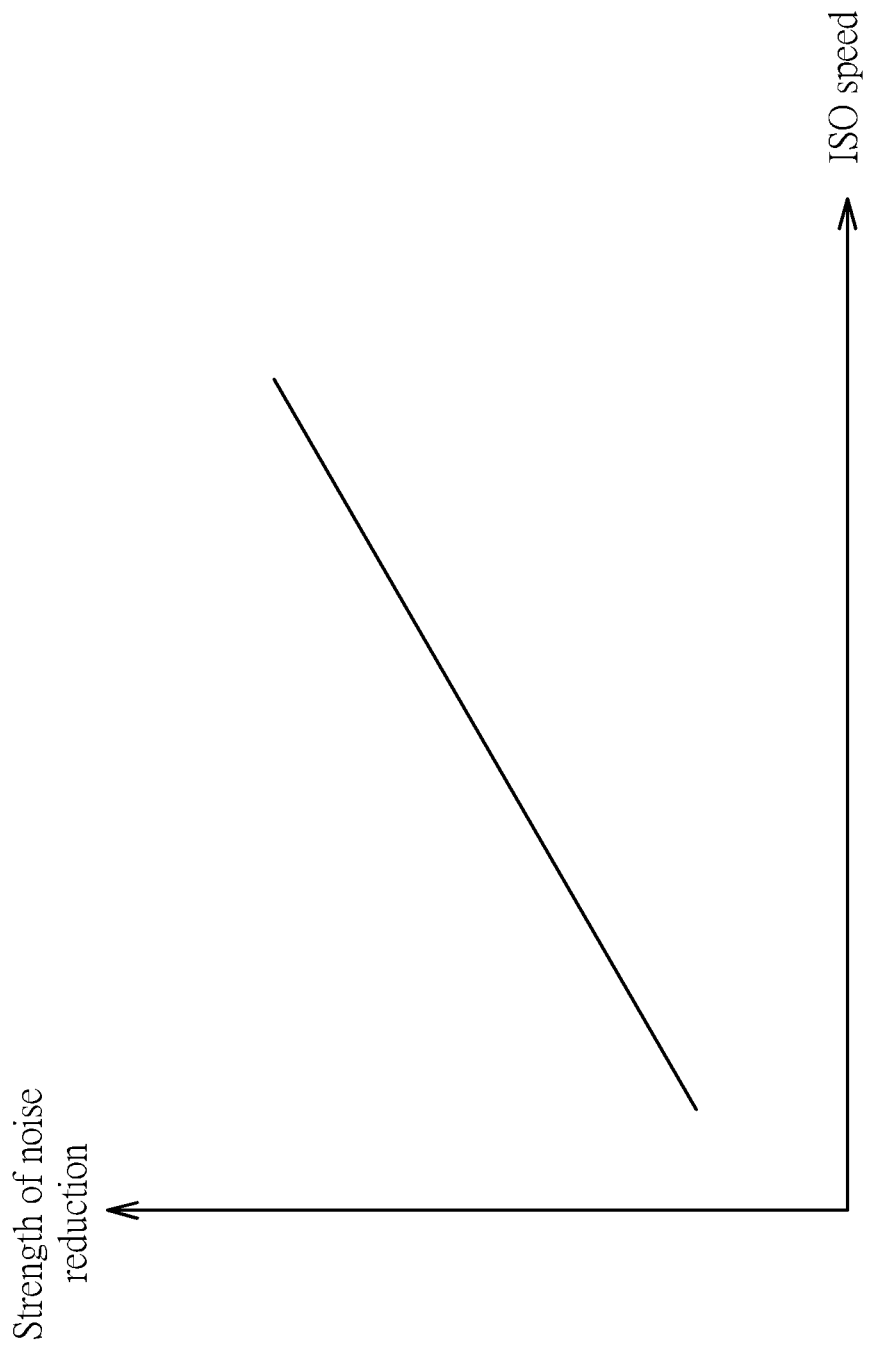
FIG. 3 shows a relationship between the ISO speed and the strength of the noise reduction according to one embodiment of the present invention.
Figure 4:
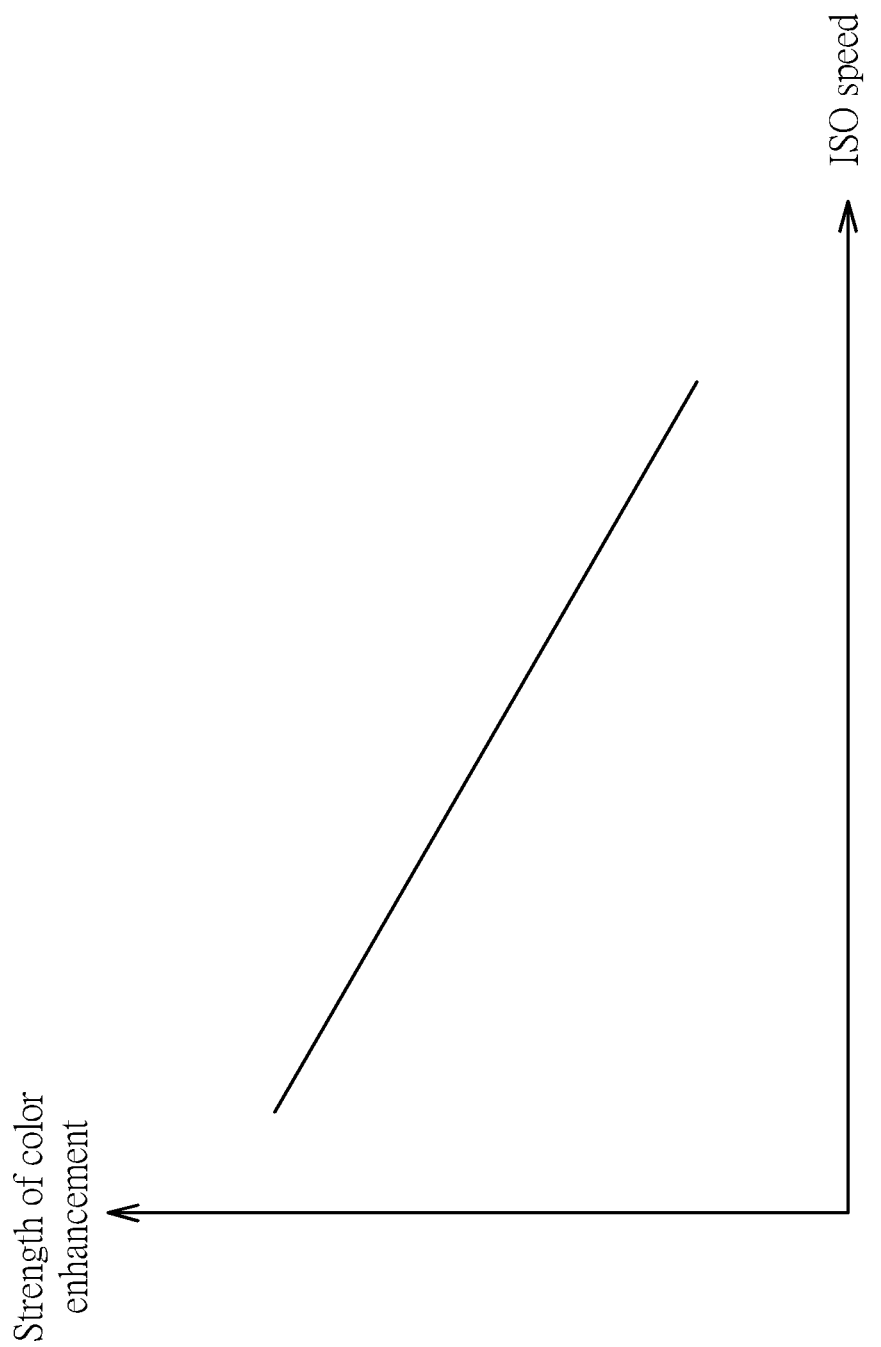
FIG. 4 shows a relationship between the ISO speed and the strength of the color enhancement according to one embodiment of the present invention.
Figure 5:
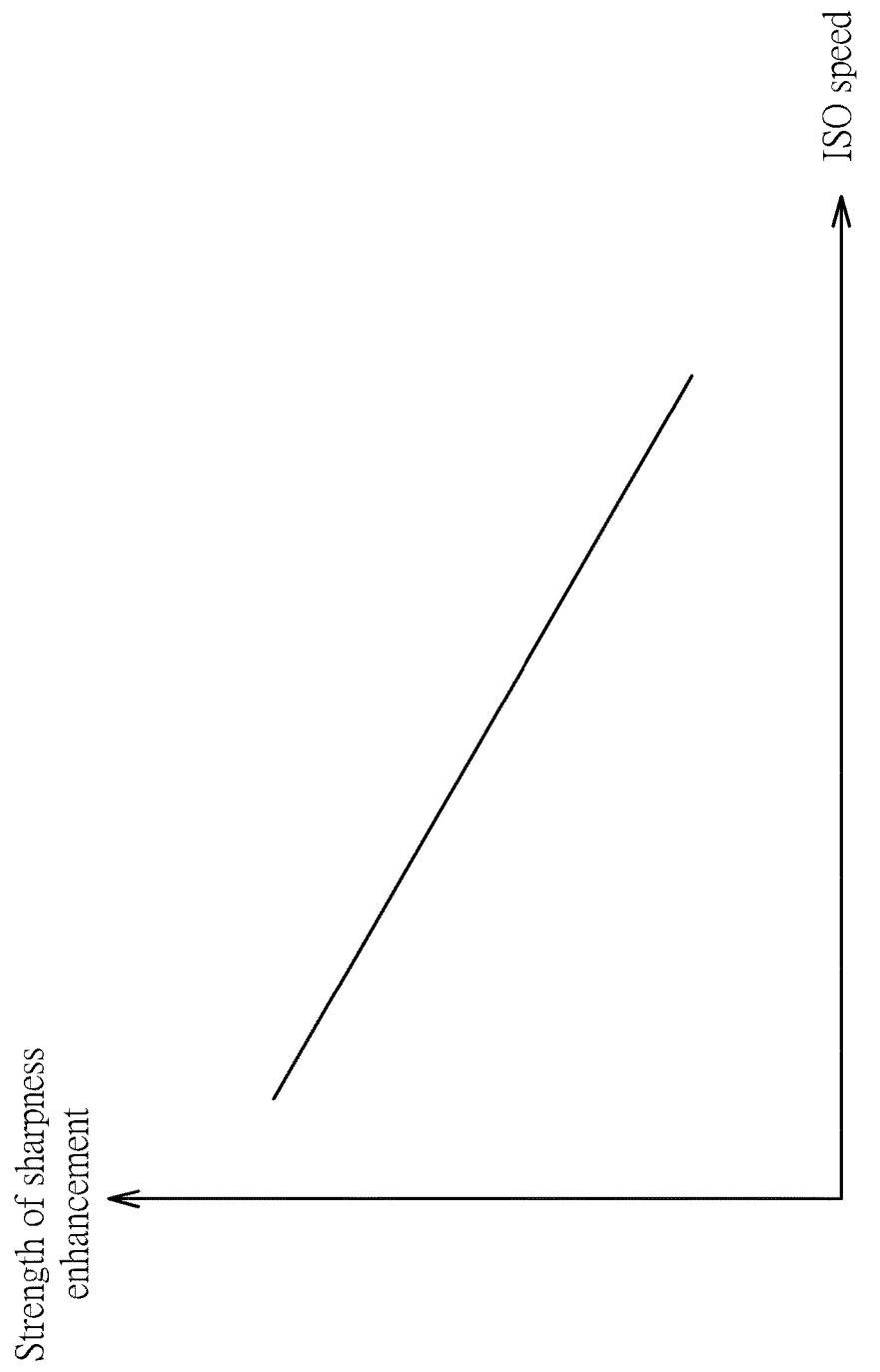
FIG. 5 shows a relationship between the ISO speed and the strength of the sharpness enhancement according to one embodiment of the present invention.

FIG. 3 shows a relationship between the ISO speed and the strength of the noise reduction according to one embodiment of the present invention, FIG. 4 shows a relationship between the ISO speed and the strength of the color enhancement according to one embodiment of the present invention, and FIG. 5 shows a relationship between the ISO speed and the strength of the sharpness enhancement according to one embodiment of the present invention. Refer to FIGS. 3-5, the lower the ISO speed, the lower strength of the noise reduction operation, the higher strength of the color enhancement operation, and the higher strength of the sharpness enhancement operation. It is noted that the linear relation shown in FIGS. 3-5 are for illustrative purposes only, and is not a limitation of the present invention. In other embodiment, the relationship between the ISO speed and the strength of the noise reduction/color enhancement/sharpness enhancement can be determined according designer's consideration.

In another embodiment, the information analyzer 220 may extract the shutter speed information from the EXIF information, and analyzes a level of the shutter speed to generate the analyzing result, and the sharpness enhancement unit 236 determines the enhancement strength according to the analyzing result. In detail, because the high shutter speed may imply that the image is captured while the environment light is strong (i.e. imply a slight motion blur of the image data), therefore, when the shutter speed of the image data is high, the sharpness enhancement unit 236 may apply a normal or low strength of sharpness enhancement operation upon the image data. On the other hand, because the low shutter speed may imply a serious motion blur of the image data, therefore, when the shutter speed of the image data is low, the sharpness enhancement unit 236 may apply a high strength of sharpness enhancement operation upon the image data to enhance the image clarity.

Figure 6:
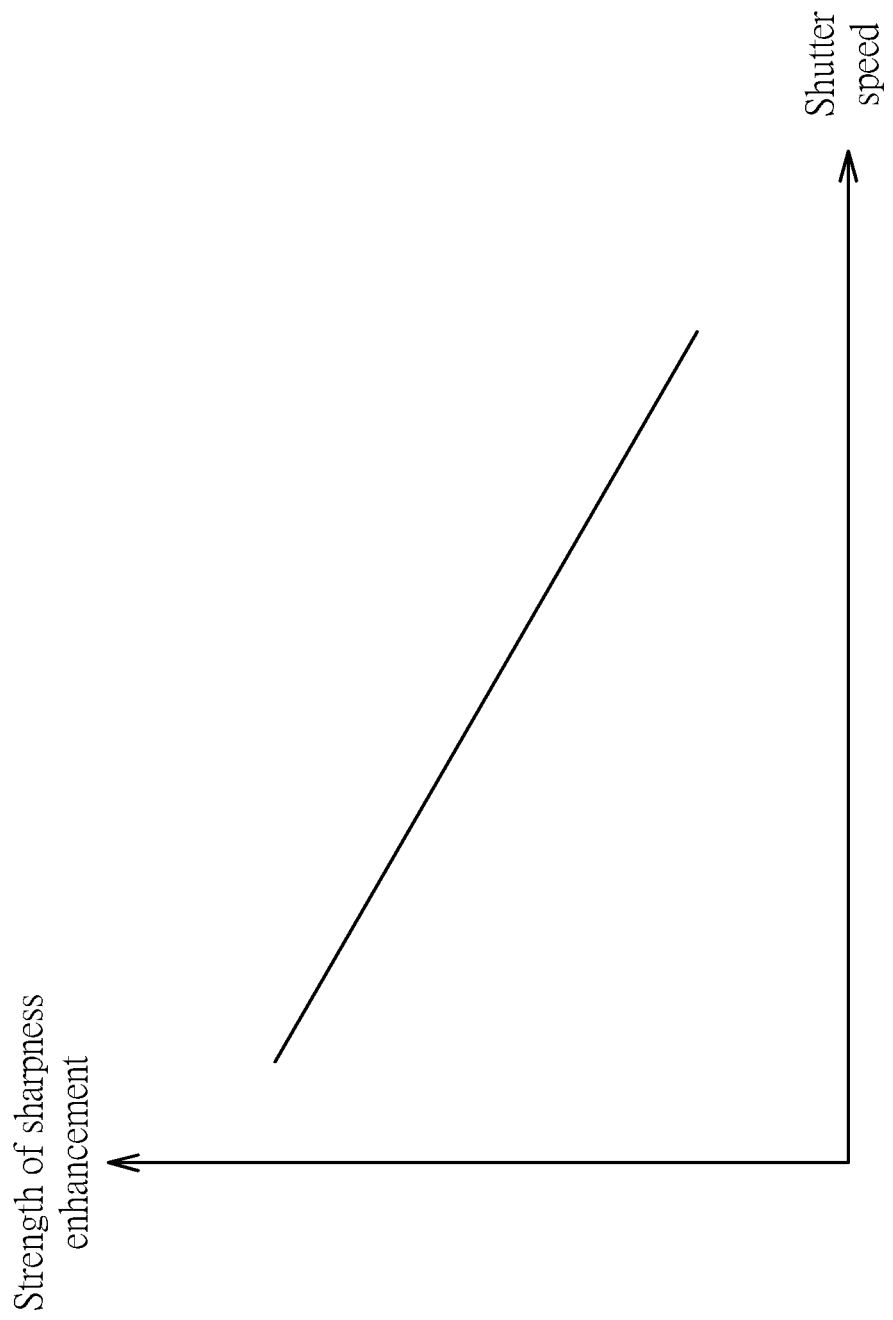
FIG. 6 shows a relationship between the shutter speed and the strength of the sharpness enhancement according to one embodiment of the present invention.

FIG. 6 shows a relationship between the shutter speed and the strength of the sharpness enhancement according to one embodiment of the present invention. Refer to FIG. 6, the lower the shutter speed, the higher strength of the sharpness enhancement operation. It is noted that the linear relation shown in FIG. 6 is for illustrative purposes only, and is not a limitation of the present invention. In other embodiment, the relationship between the shutter speed and the strength of the sharpness enhancement can be determined according designer's consideration.

In one embodiment, assuming that the image processor 160 receives the video data from the memory 140, the information analyzer 220 extracts the bit-rate information (metadata) from the video header, and analyzes a level of the bit-rate to generate the analyzing result, and the noise reduction unit 232, the color enhancement unit 234 and the sharpness enhancement unit 236 determines the enhancement strengths of their operations according to the analyzing result, respectively. In detail, because the low bit-rate may indicate that the video data suffers the coding artifacts such as blocking noise or mosquito noise, therefore, when the bit-rate is low, the noise reduction unit 232 may apply a strong noise reduction, the color enhancement unit 234 may apply a low strength of the color enhancement (i.e. weak color enhancement), and the sharpness enhancement unit 236 may apply a low strength of the sharpness enhancement (i.e. weak sharpness enhancement) upon the image data to avoid enhancing the noise.

It is noted that, in order to avoid enhancing the noise, the color enhancement operation and the sharpness enhancement operation should be performed after the noise reduction operation.

Figure 7:
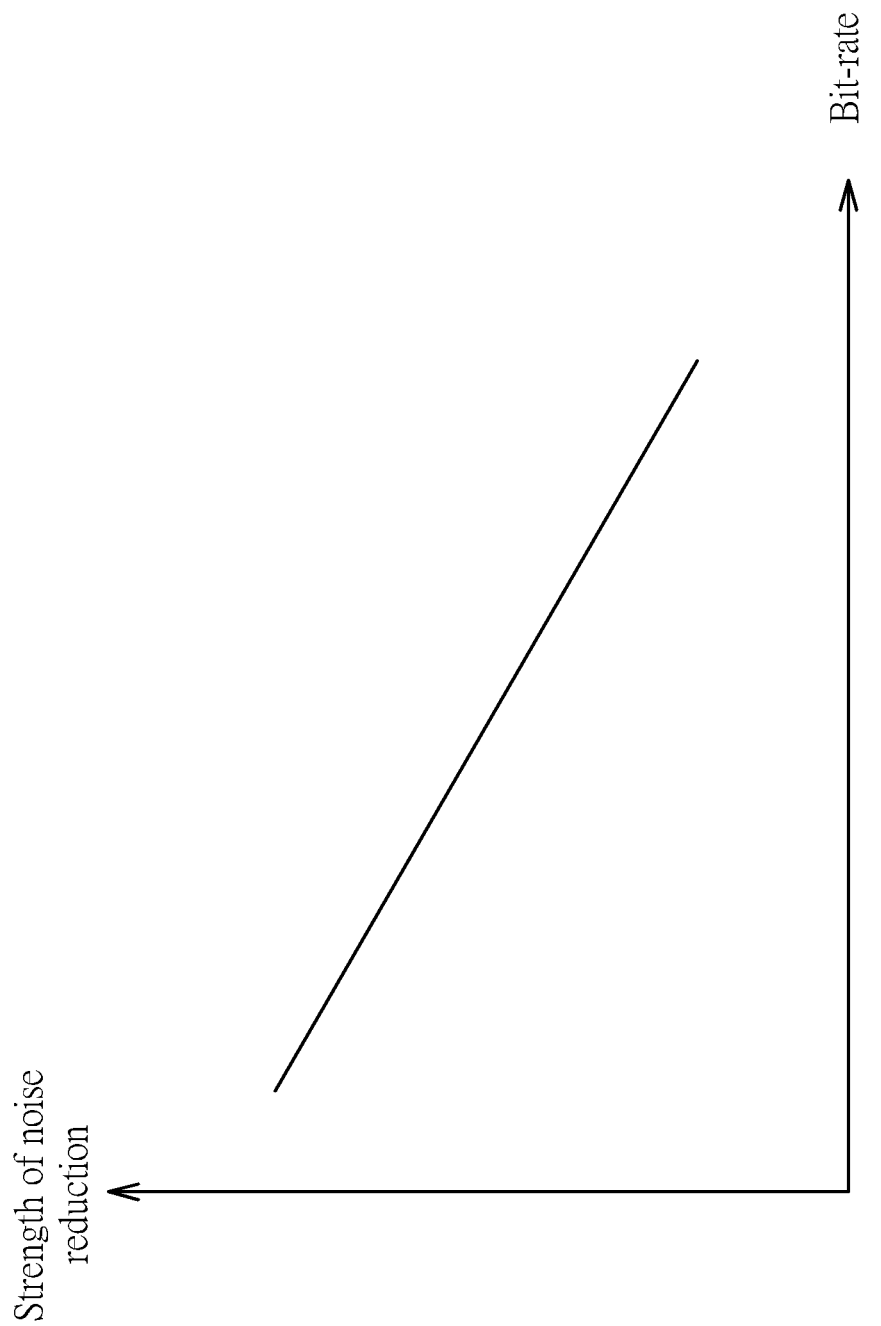
FIG. 7 shows a relationship between the bit-rate and the strength of the noise reduction according to one embodiment of the present invention.
Figure 8:
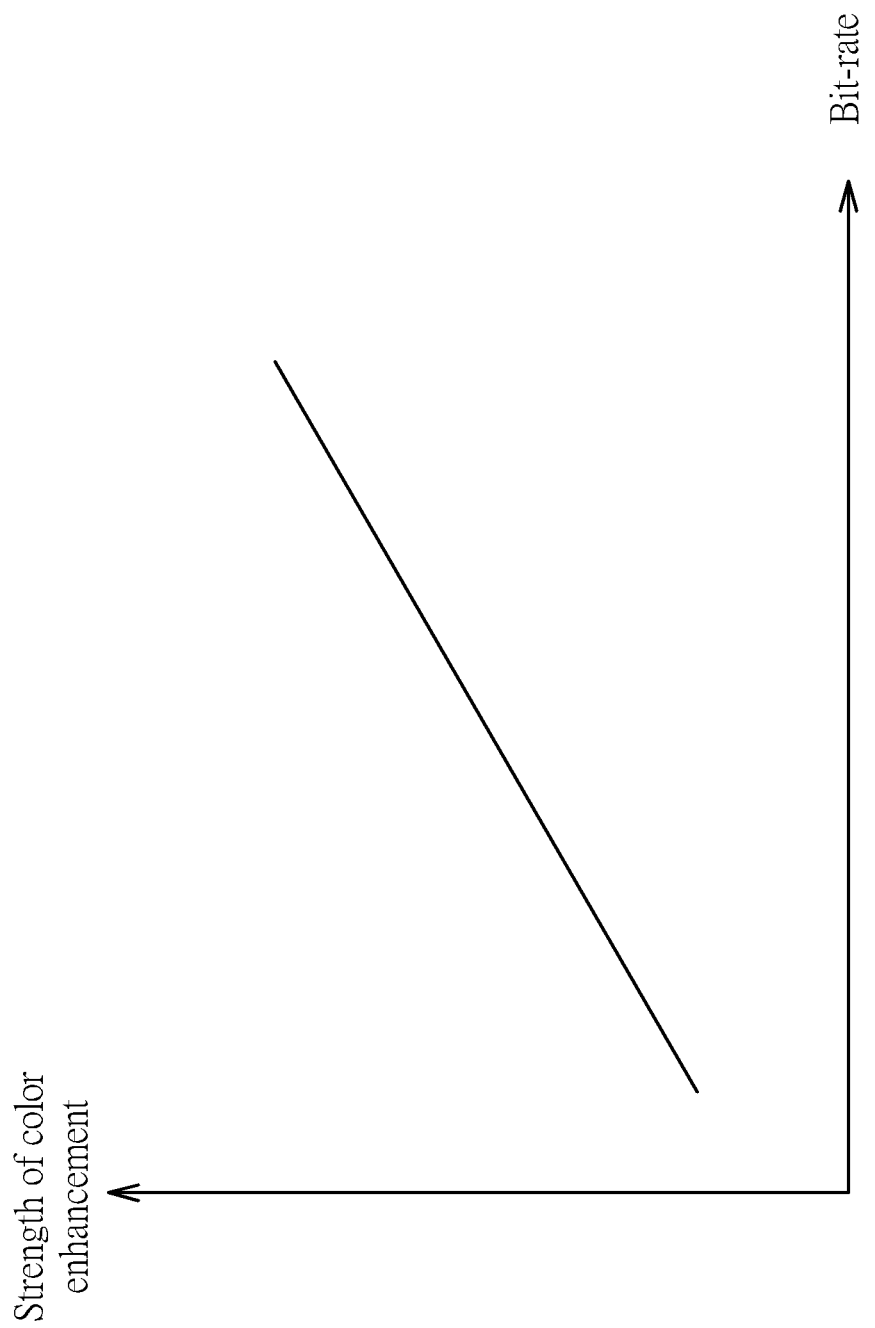
FIG. 8 shows a relationship between the bit-rate and the strength of the color enhancement according to one embodiment of the present invention.
Figure 9:
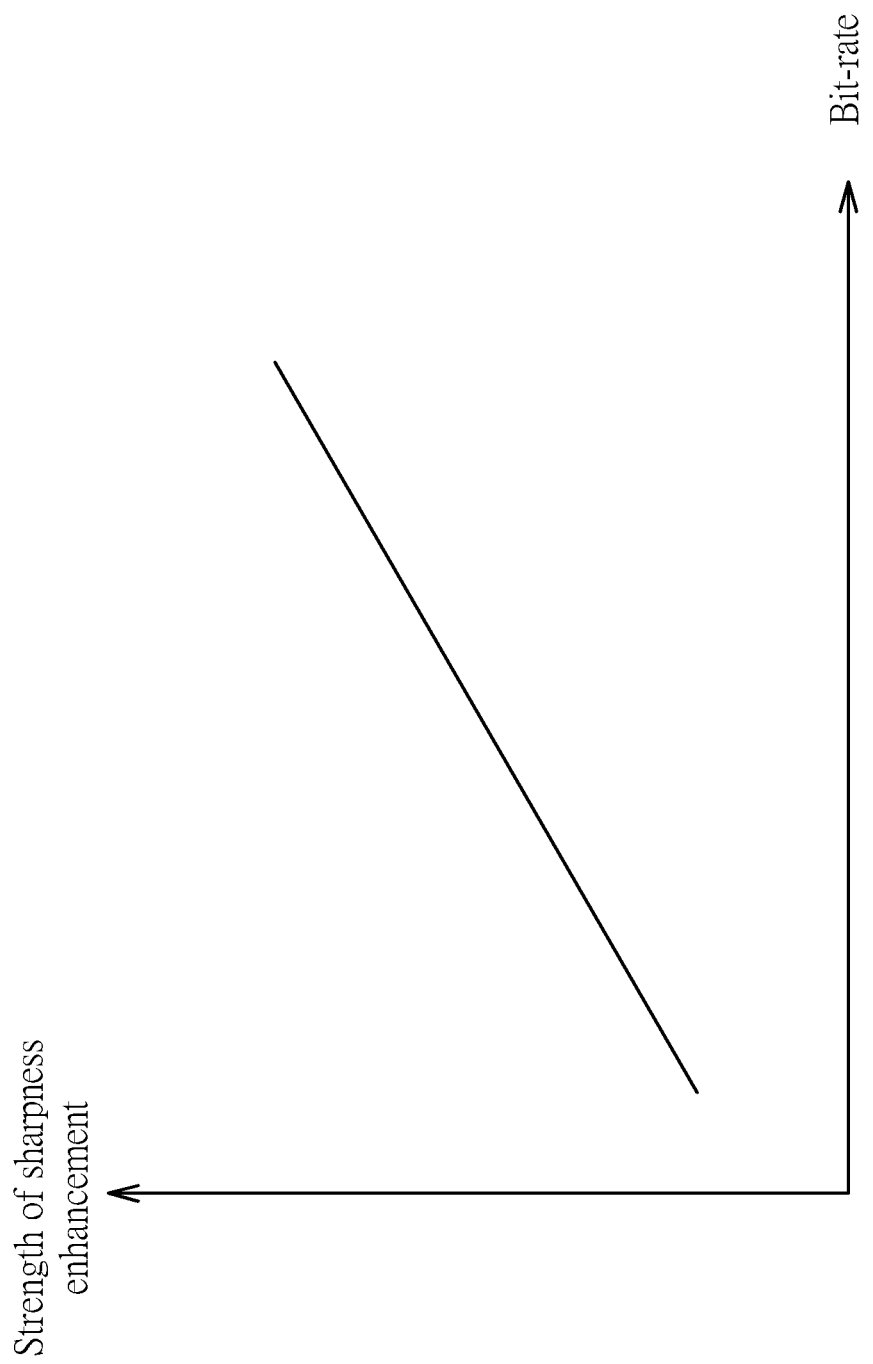
FIG. 9 shows a relationship between the bit-rate and the strength of the sharpness enhancement according to one embodiment of the present invention.

FIG. 7 shows a relationship between the bit-rate and the strength of the noise reduction according to one embodiment of the present invention, FIG. 8 shows a relationship between the bit-rate and the strength of the color enhancement according to one embodiment of the present invention, and FIG. 9 shows a relationship between the bit-rate and the strength of the sharpness enhancement according to one embodiment of the present invention. Refer to FIGS. 7-9, the lower the bit-rate, the higher strength of the noise reduction operation, the lower strength of the color enhancement operation, and the lower strength of the sharpness enhancement operation. It is noted that the linear relation shown in FIGS. 7-9 are for illustrative purposes only, and is not a limitation of the present invention. In other embodiment, the relationship between the bit-rate and the strength of the noise reduction/color enhancement/sharpness enhancement can be determined according designer's consideration.

Figure 10:
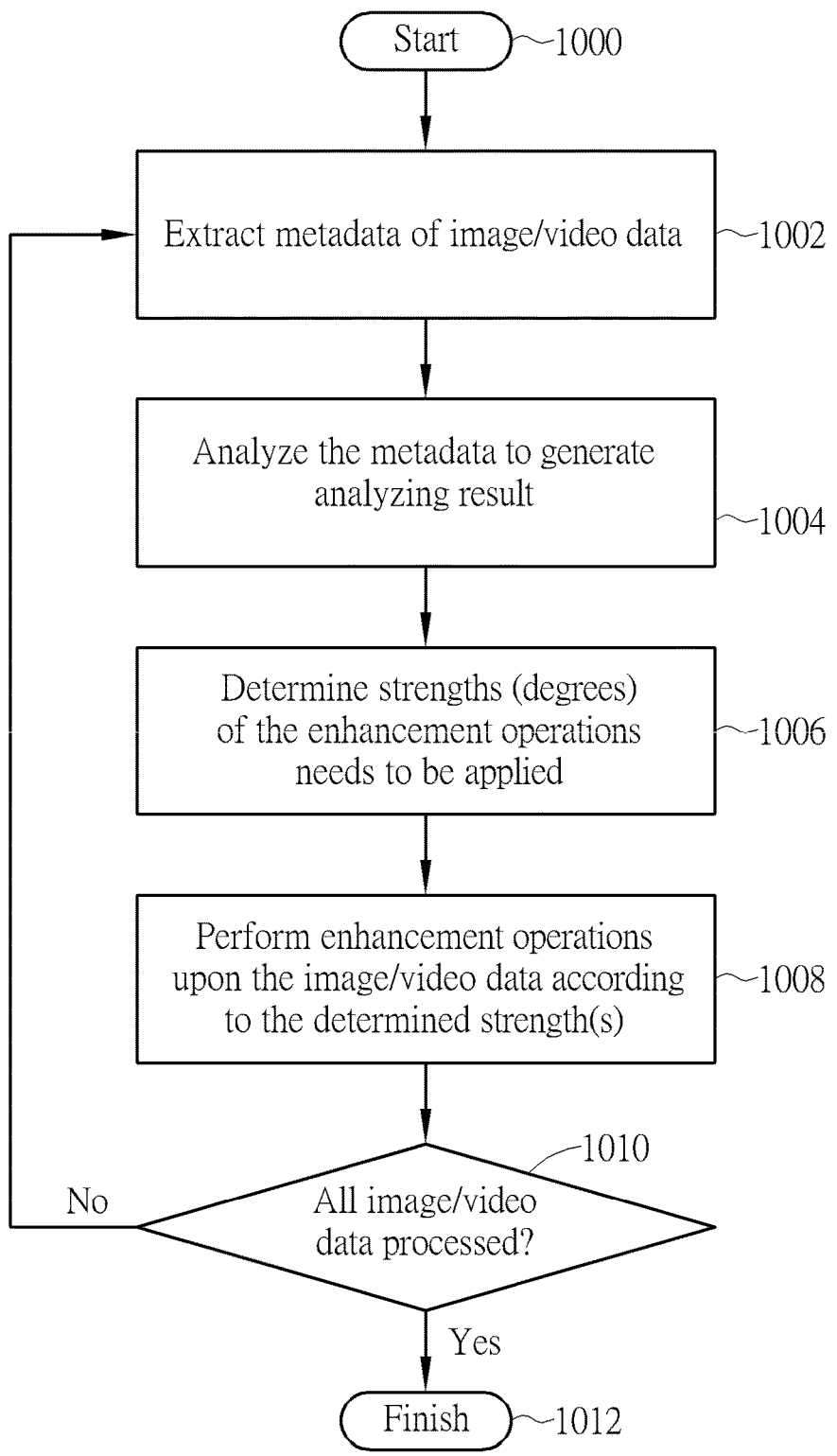
FIG. 10 shows a flowchart of a display image processing method according to one embodiment of the present invention.

FIG. 10 shows a flowchart of a display image processing method according to one embodiment of the present invention. Referring to the above disclosure, the flow is described as follows.

Step 1000: the flow starts.
Step 1002: extract metadata of image/video data.
Step 1004: analyze the metadata to generate analyzing result.
Step 1006: determine strengths (degrees) of the enhancement operations needs to be applied.
Step 1008: perform enhancement operations upon the image/video data according to the determined strength(s).
Step 1010: determine if all image/video data are processed? If yes, the flow enters Step 1012; if not, the flow goes back to Step 1002.
Step 1012: the flow finishes.

Briefly summarized, in the image processor and associated display image processing method of the present invention, the metadata of the image/video data is analyzed to respectively determine appropriate strengths of the noise reduction, color enhancement and sharpness enhancement operations. Namely, the strengths of these operations can be adaptively determined. Therefore, most of the images can have the best enhancement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processor within an electronic device having a display panel, comprising:
   a receiving circuit, for receiving image/video data and corresponding metadata;
   an information analyzer, for analyzing the metadata of the image/video data to generate at least one analyzing result, wherein the metadata comprises information for setting an image sensor while generating raw image data for the image/video data; and
   an adjusting circuit, coupled to the information analyzer, for determining an image/video quality enhancement strength/degree by referring to the analyzing result, and adjusting an image/video quality according to the determined image/video quality enhancement strength/degree to generate adjusted image/video data to the display panel.

2. The image processor of claim 1, wherein the receiving circuit receives the image data with Joint Photographic Experts Group (JPEG) format, and the corresponding metadata is exchangeable image file format (EXIF) information.

3. The image processor of claim 1, wherein the metadata comprises information of International Organization for Standardization (ISO) speed.

4. The image processor of claim 3, wherein the adjusting circuit performs at least a noise reduction operation upon the image data according to the analyzing result, and the lower the ISO speed, the lower strength of the noise reduction operation.

5. The image processor of claim 3, wherein the adjusting circuit performs at least a color enhancement operation upon the image data according to the analyzing result, and the lower the ISO speed, the higher strength of the color enhancement operation.

6. The image processor of claim 3, wherein the adjusting circuit performs at least a sharpness enhancement operation upon the image data according to the analyzing result, and the lower the ISO speed, the higher strength of the sharpness enhancement operation.

7. The image processor of claim 1, wherein the metadata comprises information of shutter speed.

8. The image processor of claim 7, wherein the adjusting circuit performs at least a sharpness enhancement operation upon the image data according to the analyzing result, and the lower the shutter speed, the higher strength of the sharpness enhancement operation.

9. The image processor of claim 1, wherein the receiving circuit receives the video data, and the corresponding metadata comprises bit-rate information of the video data.

10. The image processor of claim 9, wherein the adjusting circuit performs at least a noise reduction operation upon the video data according to the analyzing result, and the higher bit-rate of the video data, the lower strength of the noise reduction operation.

11. The image processor of claim 9, wherein after the noise reduction operation is performed, the adjusting circuit performs at least a color enhancement operation upon the video data according to the analyzing result, and the higher bit-rate of the video data, the higher strength of the color enhancement operation.

12. The image processor of claim 9, wherein after the noise reduction operation is performed, the adjusting circuit performs at least a sharpness enhancement operation upon the video data according to the analyzing result, and the higher bit-rate of the video data, the higher strength of the sharpness enhancement operation.

13. The image processor of claim 1, wherein the image sensor is implemented by complementary metal oxide semiconductor (CMOS) sensors or charge coupled device (CCD) sensors, and the analyzing result indicates the settings of the CMO sensors or the CCD sensors while the CMO sensors or the CCD sensors generates the raw image data.

14. An image processing method performed by an electronic device having a display panel, comprising:
receiving image/video data and corresponding metadata, wherein the metadata comprises information for setting an image sensor while generating raw image data for the image/video data;
analyzing the metadata of the image/video data to generate at least one analyzing result;
determining an image/video quality enhancement strength/degree by referring to the analyzing result; and
adjusting an image/video quality according to the determined image/video quality enhancement strength/degree to generate adjusted image/video data to the display panel.

15. The display image processing method of claim 14, wherein the image data is with Joint Photographic Experts Group (JPEG) format, and the corresponding metadata is exchangeable image file format (EXIF) information.

16. The display image processing method of claim 14, wherein the metadata comprises information of International Organization for Standardization (ISO) speed or a shutter speed.

17. The display image processing method of claim 14, wherein the receiving step comprises receiving the video data, and the corresponding metadata comprises bit-rate information of the video data.

18. The display image processing method of claim 14, wherein the image sensor is implemented by complementary metal oxide semiconductor (CMOS) sensors or charge coupled device (CCD) sensors, and the analyzing result indicates the settings of the CMO sensors or the CCD sensors while the CMO sensors or the CCD sensors generates the raw image data.

19. An electronic device, comprising:
an image sensor, for capturing light to generate raw image data;
an image signal processor, coupled to the image sensor, for processing the raw image data to generate image data and corresponding metadata, wherein the metadata comprises information for setting the image sensor while generating the raw image data;
a memory, coupled to the image signal processor, for storing the image data and the corresponding metadata generated from the image signal processor; and
an image processor, coupled to the memory, for obtaining the image data and the corresponding metadata from the memory, analyzing the metadata of the image data to generate at least one analyzing result, determining an image/video quality enhancement strength/degree by referring to the analyzing result, and adjusting an image/video quality according to the determined image/video quality enhancement strength/degree.

20. The electronic device of claim 19, wherein the image signal processor further packets the image data and the corresponding metadata to have Joint Photographic Experts Group (JPEG) format, and the corresponding metadata is exchangeable image file format (EXIF) information.

21. The electronic device of claim 19, wherein the corresponding metadata comprises information of International Organization for Standardization (ISO) speed or a shutter speed.

22. The electronic device of claim 19, further comprising:
a video decoder, for decoding video stream to generate video data and corresponding metadata to the image processor;
wherein the image processor further analyzes metadata of the video data to generate another analyzing result for indicating a strength of an image quality enhancement, and adjusting an video quality according to the analyzing result.

23. The electronic device of claim 19, wherein the image sensor is implemented by complementary metal oxide semiconductor (CMOS) sensors or charge coupled device (CCD) sensors, and the analyzing result indicates the settings of the CMO sensors or the CCD sensors while the CMO sensors or the CCD sensors generates the raw image data.

* * * * *